Inventor
M. MORITA-
T. HUKAMI-M. MIYAGI-
S. ITO
By [signature]
Attorney

Inventor
M. MORITA-T. HUKAMI
M. MIYAGI-S. ITO
By [signature]
Attorney

COMBINATION FREQUENCY AND TIME-DIVISION
WIRELESS MULTIPLEX SYSTEM

Filed July 22, 1964 5 Sheets-Sheet 3

Inventor
M. MORITA - T. HUKAMI -
M. MIYAGI - S. ITO
By [signature]
Attorney

Inventor
M. MORITA - T. HUKAMI -
M. MINAGI - S. ITO
By R.P. Morris
Attorney

Inventor
M. MORITA - T. HUKAMI -
M. MIYAGI - S. ITO
By [signature]
Attorney 3,370,128
Patented Feb. 20, 1968

3,370,128

COMBINATION FREQUENCY AND TIME-DIVISION WIRELESS MULTIPLEX SYSTEM

Masasuke Morita, Tadasu Hukami, Masahisa Miyagi, and Sukehiro Ito, Tokyo, Japan, assignors to Nippon Electric Company Limited, Tokyo, Japan, a corporation of Japan Filed July 22, 1964, Ser. No. 384,416
Claims priority, application Japan, July 29, 1963, 38/39,988
19 Claims. (Cl. 179—15)

ABSTRACT OF THE DISCLOSURE

A wireless communication system for transmitting and receiving each of a plurality of multiplex telephone signals with a plurality of different narrow frequency band widths, comprising a transmitter including each signal separated into a pitch component and a group of spectrum components, each pitch component encoded into a first predetermined number of pitch code elements and each spectrum component of each group thereof encoded into a second predetermined number of spectrum code elements, the pitch and spectrum code elements arranged in a predetermined time sequence during a sampling period, a plurality of sources of carrier waves of different frequencies, and program means for modulating certain of the carrier waves provided at one repetitive time rate with the pitch code elements to compress each of the latter carrier waves into one narrow frequency band width and others of the carrier waves provided at a different repetitive time rate with the spectrum code elements to compress each of the latter carrier waves into narrow band width different from the one frequency band width for transmission, and receiving means for the transmitted one and different narrow band width pitch and spectrum code element modulated certain and other carrier waves, including means operating in an order essentially inverse to the foregoing transmitting order for providing additional signals corresponding to the pitch and spectrum components and utilized to synthesize voice signals representing the telephone signals.

The present invention relates in general to a wireless multiplex transmission system and more particularly to a wireless multiplex telephone transmission system which permits communication even where the transmission band width is narrower than the multiplexed voice signal band width, or even where part of the transmission band width is required for maintaining good conversation quality, and the remaining band width is narrower than the multiplexed voice signal band width. The problems of providing transmission band width narrower than a voice signal band width occur for example in wireless communication systems using scattered ionosphere waves, scattered ultra far distant troposphere waves and reflected waves from the moon.

In prior art multiplex wireless telephone transmission systems, in which a plurality of voice signal channels are transmitted on a carrier wave, it is usual to compress the required transmission band width by extracting a pitch signal component and a group of spectrum signal components from the voice signal in each of the channels and thereafter transmitting these signal components after they have been encoded. However, this compression was inadequate since the transmission band width of the space path was narrower than this compressed band width, and the conversation quality at least was extremely poor due to phase characteristics, selective fading effects, etc. On occasion, in prior art systems communication became impossible. The illustrations above were for wireless communication systems using scattered ionosphere waves having a transmission band width of about several kilocycles or a reflected wave from the moon having a transmission band width of approximately 1 kilocycle.

The transmission band width in the former case is far narrower than a normal multiplexed voice signal band width which is in the order of, for example, 60 kilocycles for 12 channels. Moreover, compressed multiplexed voice signal band widths in the order of 15 kilocycles can be obtained. However, this compressed signal is wider than the transmission band width. Thus, for such compressed signals, it was impossible to communicate through part of the transmission band width which was even further limited in order to maintain good conversation quality. The transmission band width, for the case which makes use of reflected wave from the moon, is apparently of the order of at most telegraph transmission, and it is quite impossible to carry out the above illustrated multiplex telephone transmission through such a narrow transmission band width. Therefore, it was considered impossible in the past to transmit multiplex telephone signals by making use of wireless communication paths having such narrow transmission band widths.

In order to transmit multiplex telephone signals through wireless communication paths having such a narrow transmission band width, a system may be devised in which a plurality of wireless communication paths having separate carrier frequencies are used to transmit in parallel the pitch signal component and the spectrum signal components obtained from the above-mentioned method of band width compression. In such a system, the signal components are adequately dispersed over the respective wireless communication paths in such a manner that the band width of the signal transmitted through each of the wireless communication paths falls within the band width limit of that wireless communication path.

However, for such a system, two or more carrier waves having separate frequencies would have to be simultaneously transmitted on the transmitting side. Therefore, if a power amplifier section is used in common to all the carrier waves on the transmitting side, the power level difference between the carrier waves having the respective frequencies is enhanced due to a non-linear characteristic of the power amplifier section and thus signal components having a low level might be further weakened. On the other hand, if an individual power amplifier section (on the transmitting side) is used for each of a plurality of the carrier waves, the above-referred interference to power level difference between the respective carrier waves is eliminated. However, providing a plurality of individual power amplifier sections will sharply increase the cost of the transmitting apparatus. Moreover, if an individual transmitting antenna is provided for each of the power amplifier sections, the cost of the apparatus will be further increased. In addition, even if a common transmitting antenna is used, the feeder section for the antenna will be complex in structure and consequently quite expensive. In any event, the above-mentioned system, which merely provides parallel transmission by use of a plurality of carrier waves, not only diminishes the inherent advantages of a multiplex communication system but also markedly increases the cost of the transmitting apparatus. Therefore, it is apparent, that such a system does not really solve the problem of transmitting a multiplex telephone signal through wireless communication paths having a narrow transmission band width.

Therefore, an object of the present invention is to provide a wireless transmission system which permits a multiplexed telephone signal to be transmitted through wireless communication paths having far narrower transmission band widths than the transmission band width required for multiplexed telephone signal transmission systems in the prior art.

Another object of the present invention is to provide a wireless transmission system which permits a multiplexed telephone signal to be transmitted through a plurality of wireless communication paths having far narrower transmission band widths than the transmission band width required by even the most compressed multiplex telephone signals in the systems known in the prior art.

A further object of the present invention is to provide a wireless transmission system which transmits a multiplexed telephone signal by making use of a plurality of wireless communication paths each of which has a far narrower transmission band width than the required transmission band width for a conventional multiplex telephone signal transmission system of the prior art, without substantially increasing the cost of apparatus employed in the system of the present invention as compared with the cost of apparatus utilized in the conventional multiplex telephone wireless transmission systems.

The present invention provides a wireless transmission system for multiplexed telephone signals which encodes different portion of each signal and thereafter compresses the encoded different signal portions into different narrow frequency band widths for transmission. In this system, at least part of the transmission frequency band width of the free space path is required for maintaining conversation quality and the total frequency band width of the encoded and compressed signal portion representing such quality is narrower than the multiplexed voice signal frequency band width required for maintaining conversational quality in the prior art. The transmitting apparatus of the system of this invention also provides means for separating the voice signal in each channel into a pitch signal component and a group of spectrum signal components. The pitch and spectrum signal components are then encoded into code elements in the respective channels according to a predetermined sampling period and serially arrayed according to a predetermined time sequence. Thereafter, each of the pitch code elements representing the pitch component of each voice signal modulates one of certain carrier wave of a plurality of certain carrier waves of different frequencies and each spectrum code element representing one spectrum component of each group thereof in each voice signal modulates one other carrier wave of the plurality of other carrier waves of different frequencies. The certain carrier waves occurring at one repetitive time rate permit the compression of each of the pitch code element modulated certain carrier waves within one narrow frequency band width corresponding to the one repetitive time rate of the certain carrier waves whereas the other carrier waves occurring at a repetitive time rate different from the one repetitive time rate enable the compression of each of the spectrum code element modulated other carrier waves within a different narrow frequency band width corresponding to the different repetitive time rate of the other carrier waves for transmission in the wireless space path. These one and different narrow frequency band widths permit the modulated certain and other carrier waves, respectively, to be transmitted within the frequency band of the wireless space path and the one narrow and different frequency band widths enable the pitch code element and spectrum code element modulated certain and other carrier waves, respectively, to be transmitted within limited parts of the frequency band width of the latter space path. Receiving apparatus decodes the last-mentioned modulated certain and other carrier waves in an order essentially inverse to the above-described order for extracting fundamental waves of the one and different repetitive time rates corresponding with those of the transmitted certain and other carrier waves, respectively, to synthesize a second voice signal corresponding to the transmitter voice signal.

A feature of the present invention is the provision of a wide-band R.F. power amplifier converter which is used in common for the plurality of pitch and spectrum code element modulated certain and other carrier waves.

Another feature of the present invention is the provision that synchronous signals for multiplex time division transmission may be encoded and inserted into the predeterminal time sequence array of the pitch and spectrum code elements so as to be transmitted in the same manner as the latter code elements; and the repetition time rate with respect to the certain carrier waves allotted to the pitch code elements and with respect to the synchronous signal as used are selected to be lower than the repetition time rate for the other carrier waves allotted to the spectrum code elements.

The above-mentioned and other features and objects of this invention and the means for attaining them will become more apparent and the invention itself will be best understood by reference to the following description taken in conjunction with the accompanying drawings in which:

FIGS. 1A and 1B when placed side by side as shown in FIG. 5, is a predetermined time sequence arrangement disclosing the principle for transmitting the pitch and spectrum code elements of the pitch signal component and the spectrum signal components respectively of the voice signal according to the present invention;

Figure 1A:
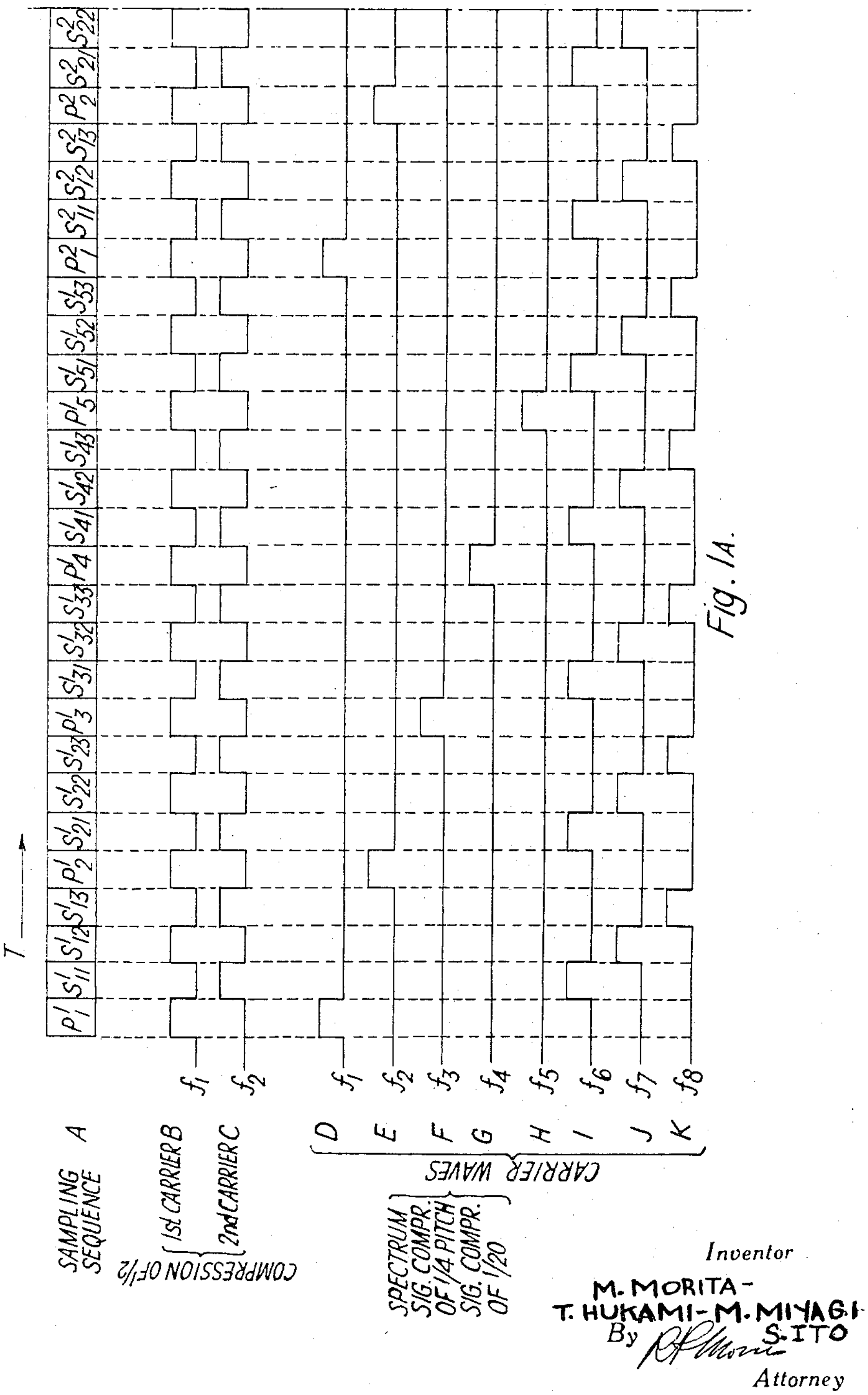
Figure 1B:
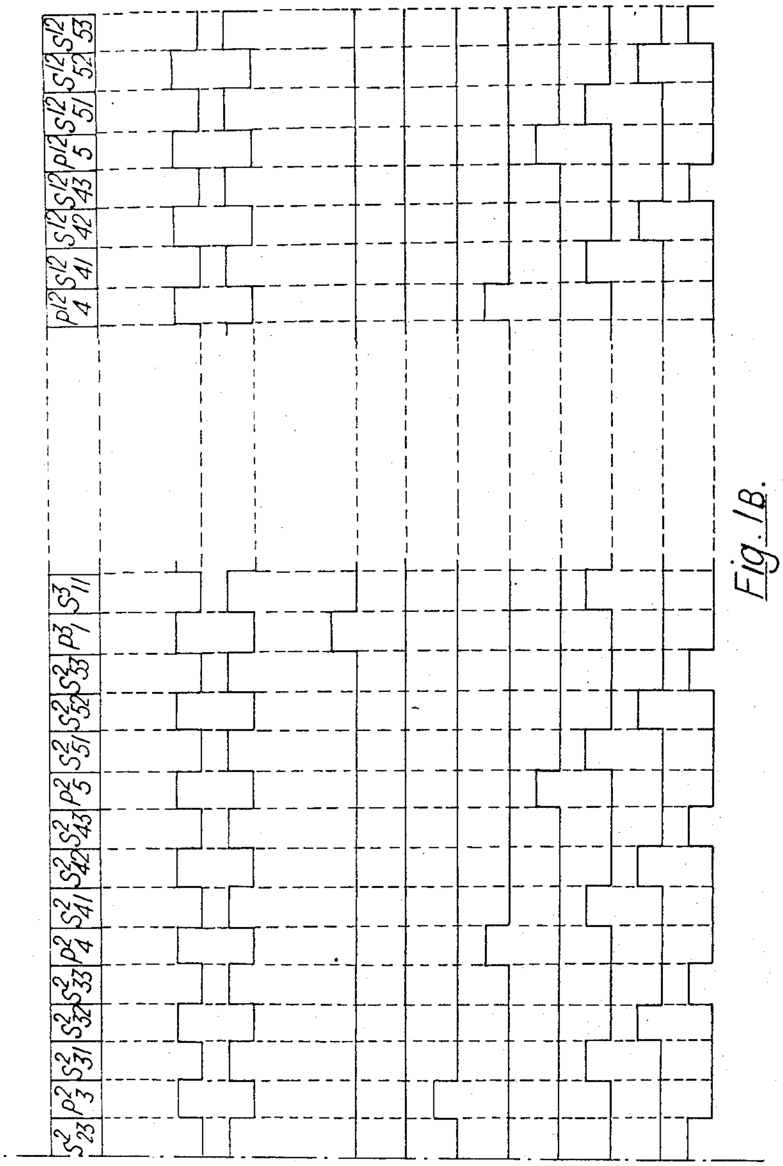
Figure 5:
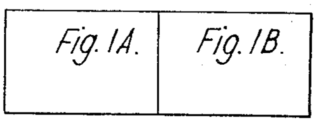
Figure 3:
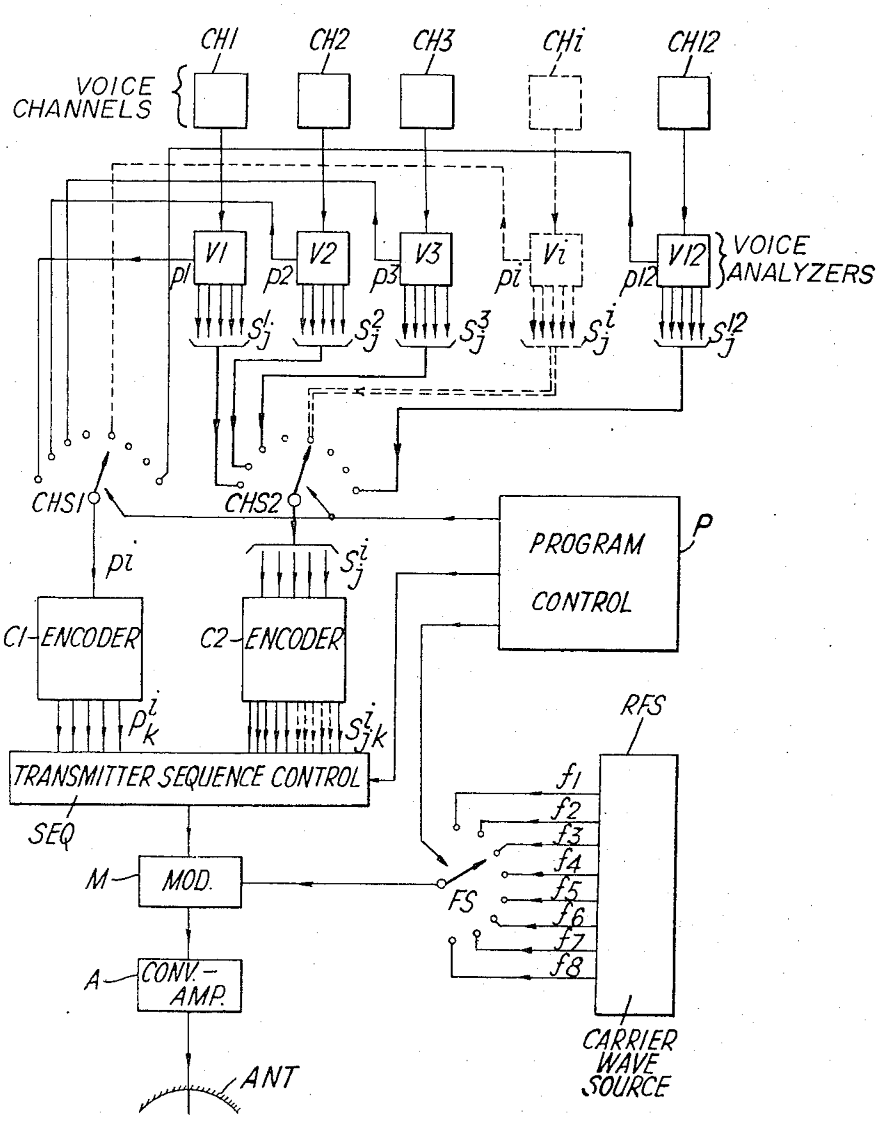
Figure 4:
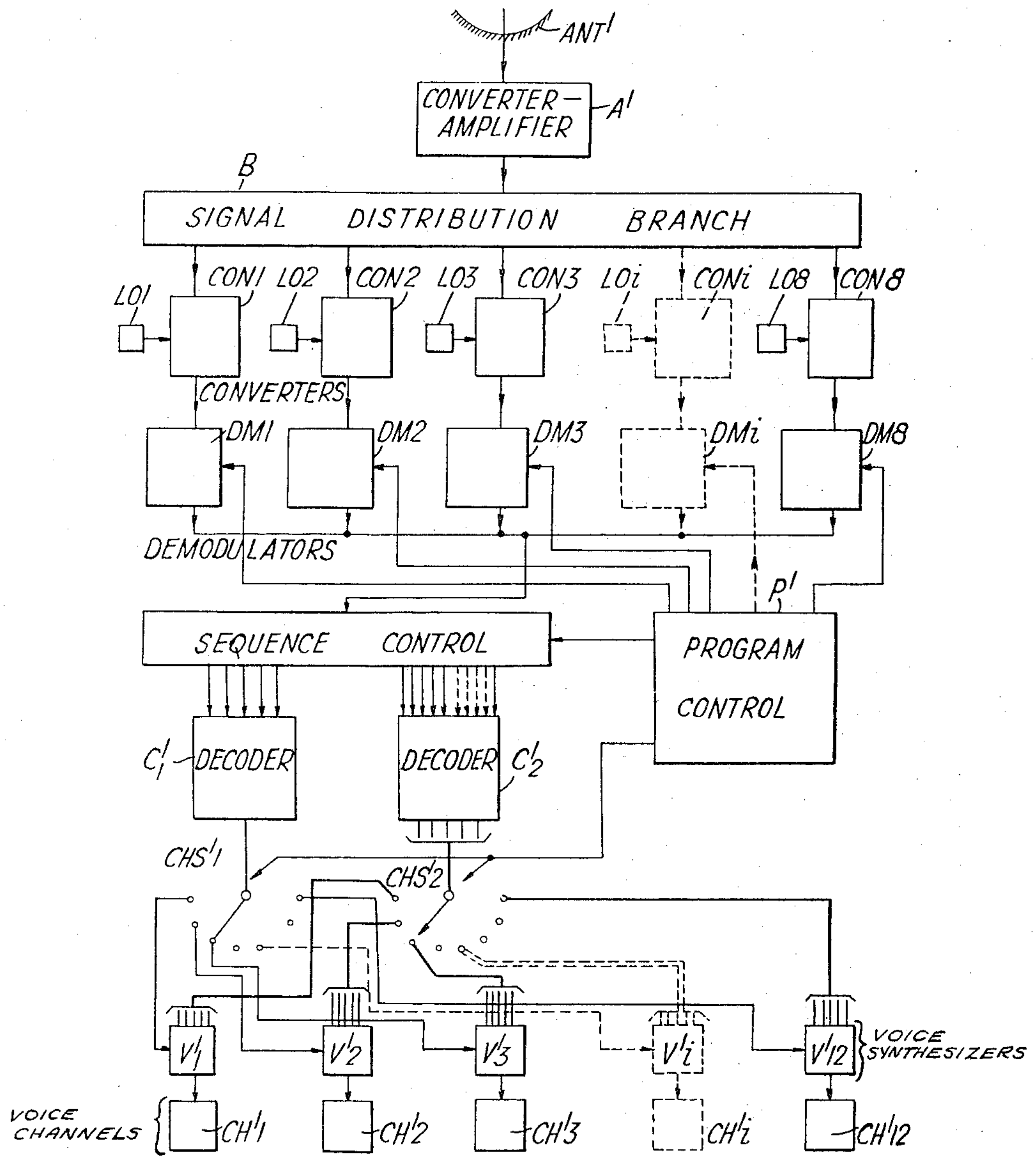

FIG. 3, as a block diagram showing a transmitter part of one embodiment of the present invention;

FIG. 4 is a block diagram showing a receiver part of one embodiment of the present invention; and FIG. 5 shows placement of FIGS. 1A and 1B.

Referring to FIGS. 1A and 1B, there is illustrated therein a plurality of timing waveforms which will facilitate an understanding of a multiplex telephone wireless transmission system of the present invention. Before entering into an explanation of the transmitter and receiver apparatus according to the present invention, it is believed best to first explain the principle of the system according to the present invention with reference to FIGS. 1A and 1B. Each of the voice signals of N channels (which are to be multiplexed and transmitted) is separated into one pitch signal component and a plurality of spectrum signal components according to the well-known band compression technique of the Vocoder type. Each of these signal components is then sampled at a predetermined sampling frequency such as, for example, 100 to 200 cycles per second (for the respective channels) and then respectively encoded by means of an adequate number of code elements. In addition, since the multiplex transmission system of the present invention is of the time division type, time division synchronous signals between the transmitting apparatus and the receiving apparatus are also used and inserted into an adequate time position (such as, for example, one for each sampling period or one for each channel) and these synchronous signals also encoded. As is well-known in Vocoder theory the spectrum signal components occupy a substantial proportion of the information quantity in a voice signal (such as, for instance, 2400 bits/sec. out of a voice signal which has been compressed in band width into 3000 bits/sec.) and have relatively little effect upon the conversation quality thereof. This is so even if the information quantity of the voice signal is reduced due to a decrease in transmission quality thereof during the wireless transmission, and therefore it is preferable to transmit the pitch signal components and the synchronous signal to have greater weight than that of the spectrum signal components. By increasing the weighting of the pitch signal components, the degree of effective voice signal band compression is enhanced. One method of such weighted transmission, of encoded pitch and spectrum signal components requires that each pitch signal component be encoded in more code elements than the code elements encoding each of the spectrum signal components in each plurality thereof. In the waveforms shown in FIGS. 1A and 1B, the pitch signal component is encoded into a 5-unit code, whereas each of the spectrum signal components of each plurality thereof is encoded into a 3-unit code. Although the synchronous signals are not shown in FIGS. 1A and 1B, any required number of synchronized code elements may be added as required.

Thus, assuming that the voice signals in 12 channels are to be transmitted, the voice signal in each channel is separated into one pitch signal component and five spectrum signal components. The pitch signal component and each of the 5 spectrum signal components are then encoded into a 5-element code and a 3-element code, respectively, i.e., $(5+(3\times5)\times12=240$ code elements for the 12 channels during each sampling period (except for the synchronous signal)).

Next, these 240 code elements are arrayed within a sampling period in a predetermined time sequence as shown in FIGS. 1A and 1B together with the synchronous signal code elements, not shown, which are to be adequately inserted. The top row A in FIGS. 1A and 1B shows an example of the time sequence array of the pitch and spectrum code elements. Certain code elements in row A have a form $P_k^i$ indicated in certain of the rectangular frames. The symbol P designates the pitch code element and the subscript $k$ designates the $k$th code element of the pitch code elements. The raised number or exponent indicates the $i$th channel of the pitch code elements. Each of the remaining code elements in row A in FIGS. 1A and 1B has a form $S_{jk}^i$ in which S designates a spectrum code element, K is the $k$th code element of the $j$th spectrum signal component in the $i$th channel, $j$ being 1, 2, 3, 4 or 5 in each of the 12 channels. In addition, since a number of possible methods exists for inserting the synchronous signal at appropriate time intervals in the predetermined pitch and spectrum code element time sequence in FIGS. 1A and 1B and since the method itself as selected from such methods is well-known and constitutes no part of the present invention, the synchronous signal is omitted from FIGS. 1A and 1B for the purpose of simplicity. It is to be noted here that although a relatively systematic array method is employed in FIGS. 1A and 1B (in which the first to twelfth channels are arrayed in a regular order, and in each channel the respective code elements of the pitch signal component, the first spectrum signal component, the second spectrum signal component . . . and the fifth spectrum signal component are arrayed in a systematically mixed order), there exist no essential requirement for employing such sequence. Once the code elements (240 in this example) have been obtained they may be arrayed in any arbitrary order (so long as the order of array is a predetermined one) so that the repetition rate of the carrier waves for the pitch code elements is lower than the repetition rate of the carrier waves for the spectrum code elements. This aspect will be described hereinafter. Moreover there is no need to take into account the channel in which a certain code element belongs, whether it is a pitch signal component or a spectrum signal component, or which time sequence or order of code element it is. The only necessary condition is that all code elements are arrayed within one sampling period in a predetermined time sequence or order.

The next stage in the multiplex telephone wireless transmission system of the present invention is the stage for modulating a carrier wave according to these code elements (1 or 0) arrayed in a predetermined order. However, if the code elements themselves modulate a carrier wave of a single frequency, then compression of band width is limited to that obtainable from Vocoder type systems.

The characteristic feature of the present invention resides in that a plurality of carrier waves having different frequencies is available for the modulating stage. The carrier waves are switched for each of the code elements in such a manner that adjacent code elements do not modulate a carrier wave of the same frequency. Thus, the respective carrier waves having different frequencies are modulated by pitch or spectrum code elements, and are then serially transmitted in a time sequence according to the above-described predetermined time sequence of code elements. Thus, at the transmitting apparatus only one carrier wave is available for modulation at a time.

The methods for the modulation of carrier waves with the pitch and spectrum code elements are well-known in the art. One known method uses amplitude modulation, another uses phase modulation, etc.

The second and third rows B and C in FIGS. 1A and 1B illustrate a method for allotting the carrier wave frequencies for the case where the rate of compressing the transmission band width (for one carrier wave according to the present invention) is lowest (compression rate: 1/2). Row B illustrates a pulse wave form in which the transmitting periods of a first carrier wave have a frequency $f_1$. Row C indicates a pulse wave form in which the transmitting periods of a second carrier wave have a frequency $f_2$ which is adequately separated from the frequency $f_1$ (as will be described further hereinafter with reference to FIG. 2). These pulse wave forms, of course, merely show the periods during which the respective carrier waves are allowed to be transmitted. Thus, since the respective carrier waves are modulated by the corresponding code elements within the respective transmitting periods, if 100% amplitude modulation is employed, it is possible for the carrier wave to disappear within any given transmitting period.

Figure 2A:
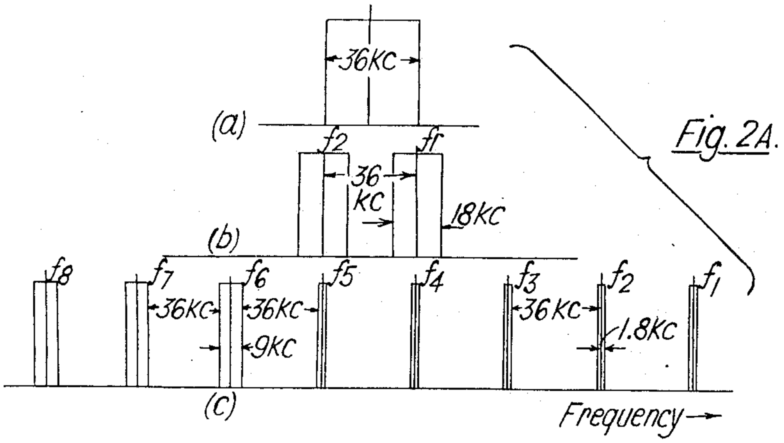
FIG. 2A is a group of blocks showing the relative transmission frequency band widths required when (a) a single carrier wave according to the prior art is used; (b) when two carriers are used; and (c) when a plurality of carrier waves according to one embodiment of the present invention are used.

According to such a method for allotting the carrier waves, the number of bits to be transmitted by one carrier wave within a unit of time is uniformly reduced by half as compared with the case where a single carrier wave is employed. In other words, it becomes possible to narrow the required transmission band width of each carrier wave by one half. FIG. 2A($a$) illustrates an example of the transmission band width required where the code elements are transmitted by means of a single carrier frequency after the above-mentioned Vocoder type band compression has been made FIG. 2A($b$) illustrates how the respective center frequencies $f_1$ and $f_2$ and the compressed band widths for the respective carrier waves are selected for the case where the same multiplex telephone signals are transmitted by two carrier waves having frequencies $f_1$ and $f_2$ and switched as indicated by rows B and C in FIGS. 1A and 1B. It is obvious from FIG. 2A that, although the required band width as a whole is increased, the band width for each carrier wave is cut in half. This is of considerable interest in communication systems making use of wireless communication paths with limited band widths.

Furthermore, if the above-mentioned allotting of a carrier waves is employed, then a power amplifier section common to all the carrier waves can be used without weakening the lower level signals which would otherwise occur due to the non-linear characteristics of the power amplifier section. This is so because the carrier waves cannot be transmitted simultaneously. Also, the two carrier frequencies $f_1$ and $f_2$ must be separated at least by the initially required band width.

The fourth to eleventh rows D, E, F, G, H, I, J, and K in FIGS. 1A and 1B illustrate the allocation of carrier wave frequencies where the rate of compressing the transmission band width for one carrier wave (according to the present invention) is higher than the above first case shown in Rows B and C. In this case pitch signal compression is 1/20 and spectrum signal compression is 1/4. Rows D to K indicate by pulse wave form the transmitting periods of eight preselected carrier waves having different frequencies $f_1$, $f_2$ . . . and $f_8$. As apparent in these figures, the eight carrier waves $f_1$, $f_2$ . . . and $f_8$ are modulated and transmitted during time periods which correspond to different pitch and spectrum code elements in the predetermined code element time sequence series shown in row A. Thus, for example, transmission is as follows:

$f_1$:$P^1_1$, $P^2_1$, $P^3_1$, . . . $P^{12}_1$, $P^1_1$, $P^2_1$, $f_2$:$P^1_2$, $P^2_2$, $P^3_2$, . . . $P^{12}_2$, $P^1_2$, $P^2_2$, $f_8$:$S^1_{13}$, $S^1_{23}$, $S^1_{33}$, $S^1_{43}$, $S^1_{53}$, $S^2_{13}$, $S^2_{23}$, $S^2_{33}$, $S^2_{43}$, $S^2_{53}$ . . . $S^{12}_{13}$, $S^{12}_{23}$, $S^{12}_{33}$, $S^{12}_{43}$, $S^{12}_{53}$, $S^1_{13}$, $S^1_{23}$

If the present invention is practiced by allotting the frequencies as indicated above, the repetition rate of the carrier waves $f_1$, $f_2$ . . . and $f_5$, carrying the pitch code elements is lower than the repetition rate of the carrier waves $f_6$, $f_7$ and $f_8$ carrying the spectrum code elements. The rate of uniformly reducing the number of bits to be transmitted within a unit time is higher for the pitch code elements than for the spectrum code elements and therefore it is possible to make the transmission band width of the carrier waves $f_1$, $f_2$ . . . and $f_5$ narrower than that of the carrier waves $f_6$, $f_7$, and $f_8$. This means that the minimum receivable input level for the pitch code element modulated carrier waves is far lower than that for the spectrum code element modulated carrier waves and that each of the pitch code element carrier waves can be transmitted with better quality through a wireless communication path having limited transmission band width. This is so because the pitch code elements and the synchronism signal are required to be transmitted with more weight described hereinabove, and as a result it is now possible to enhance the degree of effective voice signal band compression which has been taken into consideration in this invention.

By allocating the carrier frequencies as indicated in Rows D . . . K of FIGS. 1A and 1B, the transmission band width of carrier waves $f_1$, $f_2$, $f_3$, $f_4$ and $f_5$ can be compressed to 1/20 that required for transmitting all the code elements by means of a single carrier wave. Moreover, the transmission band width of the carrier waves $f_6$, $f_7$ and $f_8$ can be compressed to 1/4 that of a single carrier wave. This is clearly shown in FIG. 2A(*c*). While the carrier wave frequencies shown in FIG. 2A(*c*) satisfy the relation $f_1$, $f_2$ . . . $f_8$, it is obvious that this is an example only and that the order of magnitude of the frequencies of the respective carrier waves is irrelevant to the practice of the present invention. For the case illustrated, it is also important to note that while the occupied band width as a whole expands, the transmission band width of each carrier wave is compressed to such an extent that it enables communication to be performed through a wireless communication path with limited band width. This is understood from the fact that the system of the present invention may be realized, for instance, by extracting at the receiver apparatus the carrier wave fundamental wave of the pulse repetition rate as transmitted from the transmitter apparatus.

The present invention has been heretofore described with reference to an embodiment with a minimum degree of compression (in which the compression ratio has the minimum value of 1/2) as two carrier wave frequencies $f_1$ and $f_2$ are switched alternately. Another embodiment hereinabove described has a compression ratio higher than that of the first-mentioned embodiment and a transmission band width for each carrier wave modulated by one of the pitch code elements narrower than that for each carrier wave modulated by one of the spectrum code elements. In practicing the present invention, however, the number of carrier wave frequencies to be used and how they are to be allotted to the respective code elements depends on the transmission band widths of the wireless communication paths to be used and the degree of transmission quality to be realized through these communication paths. It is to be noted according to the present invention that by increasing the number of the carrier waves, it is possible to narrow the transmission band width with respect to each carrier wave basically to any desired extent while maintaining the condition that two or more carrier waves are not transmitted simultaneously. However, the realization of this invention will become difficult if the number of the carrier wave frequencies becomes too large. For instance, if the repetition rate of each carrier wave is equal to the sampling frequency for the original voice signal and if the number of carrier waves is equal to the number of code elements (which is 240 in this example), then the transmission band width for each carrier wave may be compressed to 1/240, and correspondingly the minimum receivable input level may be improved. In view of the periodicity of the transmitted multiplex telephone signals, the lower limit of the repetition rate for each carrier wave may be considered to be equal to the sampling frequency of the voice signal. However, if the demodulation and decoding of the received wave is adequately carried out in the receiver apparatus (as described hereinafter), it is also possible to further lower the repetition rate for each carrier wave to enable communication to be performed through wireless communication paths each of whose band widths is limited to a very narrow range. More particularly, suppose the time interval of two or more sampling periods each containing 240 code elements (as shown in FIG. 1) is taken as the repetition rate for each carrier wave. If within such an enlarged interval or period, the carrier waves having different frequencies and multiplied by a given factor are allotted according to a predetermined time sequence and if the receiving apparatus separates the respective code elements according to said predetermined time sequence (taking that enlarged period as one period) and if these code elements are decoded to reproduce the pitch signal components and the spectrum signal components at the two or more succeeding sampling points within said enlarged period for each channel, then the voice signals in the twelve channels will be reproduced from a series of these signal component values according to Vocoder theory by repeating the above operation with respect to the enlarged period.

Figure 2B:
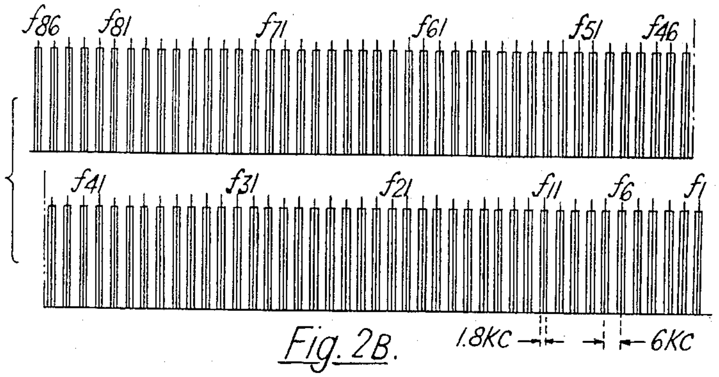
FIG. 2B is a group of blocks showing the required transmission frequency band widths according to an alternative embodiment of the present invention.

Alternatively, it is possible to carry out multiplex telephone wireless transmission by transforming a group of code elements (for example, six succeeding code elements such as code elements $P^1_{11}$, $S^1_{11}$, $S^1_{12}$, $S^1_{13}$, $P^1_2$, and $S^1_{21}$ or code elements $S^1_{22}$, $S^1_{23}$, $P^1_3$, $S^1_{31}$, $S^1_{32}$, and $S^1_{33}$) as a whole into one code, by using 64 carrier waves which are required to deliver the information reperesented by $2^6=64$ possible code combinations represented by similar codes. That is, 64/6 times as many carrier waves are required by this invention than the number of carrier waves to be used by carrying out multiplex telephone wireless transmission without transforming the code elements as a group, and by applying the principle of the present invention. In this example, since the pulse width is 6 times as wide as that in the case of not transforming the code elements as a group, the space band width for each carrier wave can be reduced to only 1/6, and the frequency separation between adjacent carrier waves may be narrowed to 1/6. In the above example, the transmission frequency band width required when a group of 8 succeeding codes are allotted to 8 groups of carrier waves according to the present invention, will be 36 kc.$\times$1/20=1.8 kc. for each of the 8$\times$64/6=86 carrier waves required. These carrier waves will have a frequency separation at least equal to 6 kc., as illustrated in FIG. 2B which corresponds to FIG. 2A divided into an upper and lower row because of lack of space.

As described, the upper limit of the compression rate of the transmission band width for each carrier wave according to the present invention, is basically infinite. However, practically, this number will be restricted by either the number of carrier wave frequencies available or the construction of filters in the receiving apparatus having the required narrow frequency pass band width. Since it is, of course, not advantageous from a practical point of view to unnecessarily increase the number of carrier waves, it is desirable to lower the repetition rate for each carrier wave to the extent required upon consideration of the transmission characteristics of the available wireless communication paths. For a given number of carrier waves, the transmission quality as a whole will be improved by selecting the repetition rate for the carrier waves carrying the code elements of the pitch signal component to be lower than the repetition rate for the carrier waves carrying the code elements of the spectrum signal components thereby to transmit the pitch signal component with more weight (as illustrated in rows D to K, in FIGS. 1A and 1B) than by selecting equal repetition rate for every carrier wave. Conversely, when the band width of the carrier waves carrying the code elements of the pitch signal component to be transmitted with more weight is compressed at a given rate, the number of carrier waves required may be reduced considerably without substantially affecting the transmission quality by making the compression rate of the band width of the carrier waves carrying the code elements of the spectrum signal components relatively low. It should be understood from the previous statement that if the carrier wave frequencies are allotted so that the pitch signal component and the synchronous signal components are transmitted with more weight, the degree of effective voice signal band compression will be enhanced.

Now that the principle of operation of the wireless transmission system of this invention has been described, an embodiment of such system including a transmitter apparatus and a receiver apparatus which operate in accordance with such principle in hereinafter described with reference to FIGS. 3 and 4 respectively.

In the following description of the apparatus, the above-noted assumption made in connection with FIGS. 1A and 1B also holds in the description given hereinafter in order to simplify the explanation and to facilitate an understanding thereof. Thus, it is assumed that each of a plurality of multiplex telephone voice signals consisting of 12 channels is separated into one pitch signal component and 5 spectrum signal components and that each of the 5 spectrum signal components is encoded into a 3-element code while the pitch signal component is encoded into a 5-element code, and that these code elements are transmitted according to the method of allotting carrier waves of successively different frequencies as indicated in rows D to K in FIG. 1.

A transmitter apparatus of this invention as shown in FIG. 3 comprises 12 voice channel communication paths CH1 through CH12 which serve as voice signal sources. Each of the voice signals is fed to a different one of a plurality of voice frequency band compression devices V1 to V12 where it is separated into a pitch signal component and a group of spectrum signal components so that the voice signal in the $i$th channel is separated into a pitch signal component $P^i$ and a group of spectrum signal components $S^i_j$ ($i$=1, 2 . . . 12: $j$=1 . . . 5). These signal components are fed to the respective banks of channel transfer switches CHS1 and CHS2 which are symbolically shown in the form of rotary switches. The channel transfer switch CHS1 is a switch for sequentially transferring the pitch signal components $P^1$ to $P^{12}$, while the channel transfer switch CHS2 is a switch for sequentially transferring the groups of spectrum signal components $S^1_j$ to $S^{12}_j$. These transfer switches, of course, may comprise an electronic type and are controlled by a transmitter program control circuit P. The pitch signal component $P^i$ and the group of spectrum signal components $S^i_j$ of each channel are subjected to time division switching by means of channel transfer switches CHS1 and CHS2 under the control of the program control circuit P and are thereafter respectively fed to encoders C1 and C2. The encoder C1 serves to encode each pitch signal component $P^i$ into 5 code elements $P^i_k$ ($k$=1, 2 . . . 5), while the encoder C2 serves to encode each spectrum signal component signal component group $S^i_j$ into 3 code elements $S^i_{jk}$ ($k$=1, 2, 3). Each of the code elements thus obtained is then fed to a transmitter sequence control circuit SEQ. This sequence control circuit SEQ rearranges the series of code elements, (which comprises $5+(3\times5)=20$ elements in this illustrated embodiment) into a predetermined time sequence (as represented in row A in FIG. 1A and 1B) under the control of the program control circuit P. These rearranged code elements are then fed from the sequence control circuit SEQ in sequence to amodulator M. A source RFS provides a plurality of R.F. carrier waves of the order of, for example, several megacycles comprising eight different carrier waves $f_1$ to $f_8$. A frequency transfer switch FS, which is also symbolically shown in the form of a rotary switch, selects one of the carrier waves of the frequencies $f_1$ to $f_8$ according to a predetermined sequence (such as shown in the rows D to K in FIG. 1 under the control of the program control circuit P) and feeds the selected one carrier wave to the modulator M. The modulator M modulates each of the selected R.F. carrier waves (supplied one at a time via frequency transfer switch FS) with one of the corresponding code elements which are sent one at a time from the sequence control circuit SEQ within a corresponding time period as illustrated in rows A and K) through K in FIGS. 1A and 1B. It is noted in the latter figures that each of the 5 pitch code elements $P_1$ through $P_5$ for each of the 12 telephone signals modulates a corresponding one of 5 carrier waves $f_1$ through $f_5$ whereas each of the 3 spectrum code elements representing each spectrum signal component of each group of 5 spectrum components for each of the 12 telephone signals modulates one of the 3 carrier waves $f_6$ through $f_8$. The modulated carrier waves are then applied one at a time to a wide-band power amplifier-frequency converter circuit A which is common to all carrier waves of frequencies $f_1$ to $f_8$. The modulated carrier waves $f_1$ through $f_8$ after being amplified in power in circuit A are then respectively converted therein into final transmitting carrier waves having higher frequencies (such as of the order of tens to thousands megacycles) and thereafter transmitted into space from a transmitter antenna ANT.

A receiver apparatus of this invention as shown in FIG. 4 is almost an inverse version of the above-described transmitter apparatus. The transmitted final carrier waves are received by a receiver antenna ANT' which is adapted to receive the final carrier waves corresponding to the certain and other carrier R.F carrier waves having the frequencies $f_1$ to $f_8$ at the transmitter apparatus. Since the final carrier wave corresponding to each frequency of the R.F. carrier waves $f_1$ to $f_8$ is confined within a predetermined time section at the transmitter apparatus, the transmitted waves can be received continuously of the receiver apparatus due to the limited transmission frequency band characteristics of the respective wireless communication paths required therefor. These received carrier waves are amplified by an amplifier frequency converter circuit A', which has wide-band frequency characteristics equivalent to those of transmitter amplifier-converter circuit A in order to include the final carrier waves corresponding to the transmitter certain and other carrier waves having frequencies $f_1$ to $f_8$. The output of amplifier-converter circuit A' contains radio frequencies of the order of, for example, several megacycles. The amplified-received carrier waves are converted into modulated signals having frequencies $f_1$ to $f_8$ and one and different repetitive time rates corresponding to the pitch code element modulated certain carrier waves having frequencies $f_1$ to $f_5$ and one repetitive time rate and spectrum code element modulated other carrier waves having frequencies $f_6$ to $f_8$ and different repetitive time rate at the transmitter apparatus. The latter converted signals, are then divided and supplied to a number of secondary frequency converters CON1 to CON8 (equal in number to the number of transmitter apparatus carrier waves $f_1$ to $f_8$) through a carrier wave distributor branch B. Each of the frequency converters CON1 to CON8 converts the corresponding one of the latter converted modulated signals of the frequencies $f_1$ to $f_8$ into a signal having predetermined frequency, a corresponding repetitive time rate, by means of local oscillation waves supplied from the individually associated local oscillators LO1 to LO8, respectively. The predetermined signals corresponding to the carrier waves $f_1$ to $f_8$ are then respectively fed from CON1 to CON8 into separate narrow-band demodulators DM1 to DM8, respectively. Thus, the 8 predetermined signals represent the 5 pitch code element modulated certain carrier waves having frequencies $f_1$ to $f_5$ and the one repetitive time rate and the 3 spectrum code element modulated other carrier waves having frequencies $f_6$ to $f_8$ and different repetitive time rate as provided at the transmitter apparatus. Five of the predetermined signals representing the 5 pitch code element modulated certain carrier waves are demodulated in 5 demodulators DM1 to DM5 into a group of first further signals corresponding to the 5 pitch code elements for each pitch component of each voice signal at the transmitter apparatus by being sustained in the latter demodulators for a time duration equivalent to the one repetitive time rate and owing to their narrow frequency band characteristics. The remaining 3 predetermined signals representing the 3 spectrum code element modulated other carrier waves are demodulated in the 3 remaining demodulators DM6 to DM8 into a group of 15 second further signals corresponding to the 15 spectrum code elements for each group of spectrum components of each voice signal at the transmitter apparatus by being sustained in the latter demodulators for a time duration equivalent to the further repetitive time rate and owing to their narrow frequency band characteristics.

It is recalled from the previous description that the one pitch component derived from each voice signal at the transmitter apparatus is encoded into 5 pitch code elements each of which modulates one of the certain carrier waves $f_1$ to $f_5$ which are supplied to modulator M at the one repetitive rate to provide each pitch code element modulated certain carrier wave $f_1$ to $f_5$ with one narrow frequency band width characteristic corresponding to such one repetitive time rate. It is also recalled from the previous explanation that each of the 5 spectrum components derived from each voice signal at the transmitter apparatus is encoded into 3 spectrum code elements at the transmitter apparatus thereby making a total of 15 spectrum code elements, and each of such 3 spectrum code elements modulates one of the other carrier waves $f_6$ to $f_8$ which are also supplied to modulator M at the different repetitive time rate to provide each spectrum code element modulated other carrier wave $f_6$ to $f_8$ with a different narrow frequency band width characteristic corresponding to such different repetitive time rate. The previous explanation of FIG. 2A($c$) mentions that each of the pitch code element modulated certain carrier waves $f_1$ to $f_5$ is provided with a frequency band width characteristic narrower than that of each spectrum code element modulated other carrier wave $f_6$ to $f_8$.

These narrow-band demodulators DM1 to DM8 are also fed with control signals from a program control circuit P' which is programed so that the demodulated 5 first further signals corresponding to the 5 pitch code elements and the 3 second further signals corresponding to 3 spectrum code elements, i.e., 15 second further signals corresponding to 15 spectrum code elements can be extracted from the respective demodulators with the repetition time rates thereof as predetermined for each carrier wave as shown in rows D to K in FIGS. 1A and 1B. Thus, each of the demodulated corresponding to one of the pitch and spectrum code elements is successively fed to a sequence control circuit SEQ'. This sequence control circuit SEQ' under control of program control circuit P' serves to extract the corresponding 5 pitch code elements from demodulators DM1 to DM5 for the same channel out of the series of code elements (shown in the row A in FIGS. 1A and 1B) and to feed such extracted 5 pitch code elements to a decoder C'1. Sequence control circuit SEQ also serves to extract 3×5 spectrum code elements from demodulators DM6 to DM8 for the same channel out of the series of code elements shown in row A in FIGS. 1A and 1B to feed such extracted spectrum code elements to a decoder C'2, under the control of the program control circuit P'. The decoders C'1 and C'2, are designed so as to decode a 5-element code and a 3-element code and to operate according to the predetermined time series of code elements shown in the row A in FIGS. 1A and 1B. Decoders C'1 and C'2 simultaneously supply at their outputs one pitch signal component and five spectrum signal components, respectively, for each transmitter apparatus voice signal successively from the first channel CH1 to the twelfth channel CH12.

These pitch and spectrum component output signals of the decoders are respectively sent to channel transfer switches CHS'1 and CHS'2, which are shown symbolically in the form of rotary switches. These channel transfer switches successively distribute one pitch signal component and five spectrum signal components to each of twelve voice synthesizer devices V'1 to V'12 corresponding to the respective channels under the control of the program control circuit P'. The respective voice synthesizer devices synthesize the one pitch components and groups of 5 spectrum components to provide voice signals equivalent to the original voice signals after the latter devices have adjusted the time relation between the supplied pitch signal components and the supplied groups of spectrum signal components. The voice signals synthesized in this way are respectively supplied to twelve voice communication paths CH'1 to CH'12.

Although the circuit parts relating to the synchronizing signals and devices have been omitted for simplicity from the explanation of the above-described embodiment of the transmitter apparatus and the receiver apparatus, it is obvious to one skilled in the art that any well-known method for synchronization can be incorporated into the system of the present invention provided it is compatible with a time division system. For example, the synchronous signals could be generated by a timing circuit in the program control circuit P of the transmitter apparatus, and then coded and inserted into adequate positions among the code sequence in the row A in FIG. 1 (allotted with a carrier wave frequency similarly to other code elements) and transmitted in an appropriate time sequence in the manner of FIGS. 1A and 1B. At the receiver apparatus these synchronizing signals would be demodulated and decoded in a manner similar to other demodulation and decoding of the pitch and spectrum elements, and a timing circuit in the program control circuit P' of the receiver apparatus could be controlled by these decoded synchronizing signals. The details of such synchronizing method and means are well-known in the art and constitute no part of the present invention.

While we have described above the principles of our invention in connection with specific embodiments, it is to be clearly understood that this description is made only by way of example, and not as a limitation to the scope of our invention as set forth in the objects thereof and the accompanying claims.

What is claimed is:

1. A wireless multiplex transmitter apparatus for transmitting a plurality of multiplex telephone signals, each having a plurality of different narrow frequency band widths, comprising:

a plurality of sources of telephone signals;

a plurality of frequency separating means, each separating one of said signals into a pitch component and a group of spectrum components;

means for encoding each of said pitch components into a first predetermined number of code elements and each spectrum component of each of said groups of spectrum components into a second predetermined number of code elements;

means for arranging said pitch and spectrum code elements in a time sequence;

means for generating a plurality of carrier waves having different frequencies and a number equal to the sum of said first and second predetermined numbers of code elements;

means for modulating said carrier waves with said pitch and spectrum code elements;

means for simultaneously controlling said encoding means, code element arranging means and carrier generating means to apply said pitch and spectrum code elements and carrier waves in a predetermined time sequence in each of successive sampling periods to said modulating means to modulate each of certain of said carrier waves with one of said pitch code elements and each of others of said carrier waves with one of said spectrum code elements and at the same time to apply said certain and other carrier waves at one and different repetitive time rates, respectively, to said modulating means in said predetermined time sequence in each of said successive sampling periods to compress each of said pitch code element modulated certain carrier waves into the narrow frequency band width corresponding to said one repetitive time rate and to compress each of said spectrum code element modulated other carrier waves into a narrow frequency band width different from said one narrow frequency band width and corresponding to said different repetitive time rate;

and means for transmitting said pitch and spectrum code element modulated certain and other carrier waves.

2. A wireless multiplex transmitter apparatus as set forth in claim 1 wherein each of said spectrum component groups comprise 5 spectrum components.

3. A wireless multiplex transmitter apparatus as set forth in claim 2 wherein said second predetermined number of spectrum code elements for each of said spectrum components is 3.

4. A wireless multiplex transmitter apparatus as set forth in claim 3 wherein the total number of spectrum code elements for each of said groups of spectrum components is 15 which comprises said second predetermined number of spectrum code elements multiplied by the number of spectrum components in each of said groups thereof.

5. A wireless multiplex transmitter apparatus as set forth in claim 1 wherein said encoding means comprises a first encoding means for selecting said pitch component from each of said separating means in turn for encoding into said first predetermined number of pitch code elements and a second encoding means for selecting said group of spectrum components from each of said separating means in turn for encoding into said second predetermined number of spectrum code elements, said last-mentioned first and second encoding means being simultaneouslly controlled by said controlling means to select said last-mentioned pitch component and group of spectrum components at the same time from each of said separating means in turn.

6. A wireless multiplex transmitter apparatus as set forth in claim 1 wherein said controlling means comprises a preselected programmed control circuit.

7. A wireless mutiplex transmitter apparatus as set forth in claim 1 wherein said first predetermined number of code elements for each of said pitch components is 5.

8. A wireless multiplex transmitter apparatus as set forth in claim 1 wherein said predetermined time sequence of said pitch and spectrum code elements for each of said telephone signals comprises each pitch code element of said first predetermined number of pitch code elements followed by said second predetermined number of spectrum code elements representing one spectrum component of each group of spectrum components.

9. A wireless multiplex transmitter apparatus as set forth in claim 8 wherein said first predetermined number of pitch code elements comprises 5 and said second predetermined number of spectrum code elements comprises 3 so that said predetermined code element time sequence for each of said telephone signals comprises each of said last-mentioned 5 pitch code elements followed by said last-mentioned 3 spectrum code elements.

10. A wireless multiplex transmitter apparatus as set forth in claim 1 wherein said one repetitive time rate for each of said pitch code element modulated certain carrier waves is lower than said different repetitive time rate for each of said spectrum code element modulated other carrier waves.

11. A wireless multiplex transmitter apparatus as set forth in claim 1 wherein said carrier wave generating means generates said plurality of different carrier waves comprising 8 in number.

12. A wireless multiplex communication system for transmitting and receiving a plurality of multiplex telephone signals, each having a plurality of different narrow frequency band widths, comprising:

transmitter apparatus including:

a plurality of sources of telephone signals;

a plurality of frequency separating means, each connected to one of said signal sources for separating the signal thereof into a pitch component and a group of spectrum components;

means for encoding each of said pitch components into a first predetermined number of pitch code elements and each of said spectrum components into a second predetermined number of spectrum code elements;

means for arranging said pitch and spectrum code elements into a time sequence;

means for generating a plurality of carrier waves having different frequencies and a number equal to the sum of said first and second predetermined numbers of code elements;

means for modulating said carrier waves with said pitch and spectrum code elements;

first program means for simultaneously controlling said encoding means, code element arranging means and carrier generating means to apply said pitch and spectrum code elements and carrier waves in a first predetermined time sequence in each of successive sampling periods to said modulating means to modulate each of certain of said carrier waves with one of said pitch code elements and each of others of said carrier waves with one of said spectrum code elements and at the same time to apply said certain and other carrier waves at one and different repetitive time rates, respectively, to said modulating means in said first predetermined time sequence in each of said successive sampling periods to compress each of said pitch code element modulated certain carrier waves into one narrow frequency band width corresponding to said one repetitive time rate and to compress each of said spectrum code element modulated other carrier waves into a narrow frequency band width different from said one narrow frequency band width and corresponding to said different repetitive time rate;

and means for transmitting said pitch and spectrum code element modulated certain and other carrier waves as carrier waves having frequencies higher than those of said last-mentioned certain and other carrier waves and also having one and different repetitive time rates and one and different frequency band widths corresponding to said one and different repetitive time rates and one and different narrow frequency band widths of said last-mentioned certain and other carrier waves, respectively, in said predetermined time sequence in each of said successive sampling periods;

and receiver apparatus including:

means for receiving and converting said transmitted higher frequency carrier waves into a plurality of signals having predetermined frequencies, one and different repetitive time rates and one and different frequency band widths corresponding to those of said modulated certain and other carrier waves, respectively, said last-mentioned predetermined signals also having a number equal to the sum of the numbers of said last-mentioned certain and other carrier waves;

a plurality of first demodulating means having a number equal to the number of said certain carrier waves, each of said last-mentioned means having a narrow frequency band width equivalent to said one narrow frequency band width of each of said pitch code element modulated certain carrier waves, for demodulating each of successive first groups of said predetermined signals, each of said latter groups having a number of predetermined signals equal to said last-mentioned number of certain carrier waves, into successive first groups of further signals, each of said latter groups having a number of further signals equal to said first predetermined number of pitch code elements, said first demodulating means sustaining said last-mentioned successive first groups of predetermined signals for a time duration equivalent to said one repetitive time rate of said certain carrier waves to provide said successive first groups of further signals;

a plurality of second demodulating means having a number equal to the number of said other carrier waves, each of said last-mentioned means having a narrow frequency band width equivalent to said different frequency band width of each of said spectrum code element modulated other carrier waves, for demodulating successive second groups of said predetermined signals, each of said last-mentioned groups having a number of predetermined signals equal to said last-mentioned number of other carrier waves, into successive second groups of further signals, each of said last-mentioned groups having a number of further signals equal to said second predetermined number of spectrum code elements multiplied by the number of components in each of said groups of spectrum components, said second demodulating means sustaining said last-mentioned successive second groups of predetermined signals for a time duration action equivalent to said different repetitive time rate of said other carrier waves to provide said successive second groups of further signals;

means for arranging said further signals of said successive first and second groups thereof in a time sequence;

second program means for simultaneously controlling said first and second demodulating means and further signal arranging means to arrange said last-mentioned further signals of said first and second groups thereof in a second predetermined time sequence equivalent to said first predetermined time sequence arrangement of corresponding pitch and spectrum code elements in each of said successive sampling periods;

means for decoding said successive first and second further signal groups in said second predetermined time sequence in each of said successive sampling periods to provide successive discrete first additional signals corresponding to said successive discrete first additional signals corresponding to said successive discrete pitch components and successive groups of second additional signals corresponding to said successive groups of spectrum components, each of said first additional signals representing one of said first further signal groups and each of said second additional signal groups representing one of said second further signal groups and having a number of second additional signals equal to said number of said further signals in each of said second groups thereof divided by said second predetermined number of spectrum code elements;

means controlled by said second program means simultaneously with said control of said first and second demodulating means and further signal arranging means for simultaneously selecting from said decoding means one of said first additional signals and one of said groups of second additional signals corresponding to said pitch component and one group of spectrum components, respectively, derived from each input telephone signal in each of said successive sampling periods;

a plurality of voice signal synthesizing means, each connectable in turn to said last-mentioned selecting means, for synthesizing said selected one first additional signal and one group of second additional signals into a voice signal representing one of said input telephone signals in each of said successive sampling periods;

and a plurality of voice frequency transmission channels, each connected to one of said synthesizing means, for receiving said synthesized voice signals.

13. A wireless transmitter apparatus for multiplex telephone signals, each having a plurality of different narrow frequency band widths, comprising:

a plurality of sources of telephone signals;

a plurality of frequency separating means, each connected to one of said signal sources for separating the signal thereof into a pitch component and a group of spectrum components;

program control means;

first selecting means connectable to each of said separating means in turn for selecting said pitch component therefrom in each of successive sampling periods;

second selecting means connectable to each of said separating means in turn for selecting said group of spectrum components therefrom in each of said successive sampling periods, said first and second selecting means simultaneously activated by said program means to select said pitch component and group of spectrum components at the same time from each of said separating means in turn in each of said successive sampling periods;

first encoding means for encoding each of said selected pitch components in turn into a first predetermined number of pitch code elements;

second encoding means for encoding each spectrum component in each of said selected groups thereof in turn into a second predetermined number of spectrum code elements, said first and second encoding means simultaneously actuated with said first and second selecting means to encode said last-mentioned selected pitch component and group of spectrum components at the same time upon the simultaneous selection of said pitch component and group of spectrum components in each of said successive sampling periods;

means controlled by said program means simultaneously with the simultaneous activation of said first and second selecting means and actuation of first and second encoding means for arranging said pitch and spectrum code elements in a time sequence;

a plurality of sources of carrier waves having different frequencies and a number equal to the sum of said first and second predetermined numbers of pitch and spectrum code elements;

means for modulating said carrier waves with said pitch and spectrum code elements;

third means to select said carrier waves one at a time for application to said modulating means;

said program means actuating said third selecting means simultaneously with the activation of said first and second selecting means and actuation of said code element arranging means to apply said pitch and spectrum code elements and carrier waves in a predetermined time sequence in each of said successive sampling periods to said modulating means to modulate each of certain of said carrier waves with one of said pitch code elements and each of others of said carrier waves with one of said spectrum code elements and at the same time to apply said certain and other carrier waves at one and different repetitive time rates, respectively, to said modulating means in said predetermined time sequence in each of said successive sampling periods to compress each of said pitch code element modulated certain carrier waves into one narrow frequency band width corresponding to said one repetitive time rate and to compress each of said spectrum code element modulated carrier waves into a narrow frequency band width different from said one narrow frequency band width and corresponding to said different repetitive time rate;

and means for transmitting said pitch and spectrum code element modulated certain and other carrier waves in said one and different frequency band widths, respectively, in said predetermined time sequence in each of said successive sampling periods.

14. A wireless transmitter apparatus for a multiplex telephone signal having a plurality of different narrow frequency band widths, comprising:

a source of a telephone signal;

means connected to said source for separating said signal thereof into a pitch component and a group of spectrum components;

means for encoding said pitch component into a first predetermined number of pitch code elements and each of said spectrum components into a second predetermined number of spectrum code elements;

means for arranging said pitch and spectrum code elements into a time sequence;

means for generating a plurality of carrier waves having different frequencies and equal in number to the sum of said first and second predetermined numbers of pitch and spectrum code elements;

means for modulating said carrier waves with said pitch and spectrum code elements;

program means for simultaneously actuating said encoding means, code element arranging means and carrier means to apply said pitch and spectrum components and carrier waves in a predetermined time sequence in each of successive sampling periods to said modulating means to modulate each of certain of said carrier waves with one of said pitch code elements and each of others of said carrier waves with one of said spectrum code elements and at the same time to apply said certain and other carrier waves at one and different repetitive time rates, respectively, to said modulating means in said predetermined time sequence in each of said successive sampling periods to compress each of said pitch code element modulated certain carrier waves into one narrow frequency band width corresponding to said one repetitive time rate and to compress each of said spectrum code element modulated carrier waves into a narrow frequency band different from said one narrow frequency band width and corresponding to said different repetitive time rate;

and means for transmitting said pitch and spectrum code element modulated certain and other carrier waves.

15. A wireless receiver apparatus for receiving a plurality of multiplexed telephone signals, each signal represented by a first preselected number of certain carrier waves having different frequencies and occurring at one repetitive time rate and modulated by a first predetermined number of pitch code elements derived from a corresponding pitch component separated from said signal to provide each of said last-mentioned modulated certain carrier waves with one narrow frequency band width in a first predetermined time sequence in each of successive sampling periods for transmission in a first wireless transmission path having said one narrow frequency band width, said last-mentioned signal also represented at the same time by a second preselected number of other carrier waves having frequencies different from those of said certain carrier waves and occurring at a repetitive time rate different from the said one repetitive time rate and modulated by a second predetermined number of spectrum code elements derived from each spectrum component of a corresponding group of spectrum components separated from said signal to provide each of said other carrier waves with a narrow frequency band width different from said one narrow frequency band width in a second predetermined time sequence in each of said successive sampling periods for transmission in a second wireless transmission path having said different narrow frequency band width, said pitch and spectrum code element modulated certain and other carrier waves transmitted as carrier waves having frequencies higher than those of said last-mentioned certain other carrier waves and having one and different frequency band widths corresponding to said one and different frequency band widths of said modulated certain and other carrier waves, respectively, comprising:

means for receiving and converting said higher frequency carrier waves into a plurality of signals having predetermined frequencies, one and different repetitive time rates and one and different frequency band widths corresponding to those of said modulated certain and other carrier waves in accordance with said first and second predetermined time sequences in each of said successive sampling periods, said last-mentioned predetermined signals having a number equal to the sum of said first and second preselected numbers of said certain and other carrier waves, respectively;

a plurality of first demodulating means having a number equal to said first preselected number of certain carrier waves, each of said demodulating means having a narrow frequency band width corresponding to said one narrow frequency band width of each of said pitch code element modulated certain carrier waves, for demodulating each of successive first groups of said predetermined signals, each latter group having a number of said predetermined signals equal to said first preselected number of said certain carrier waves, into successive first groups of further signals, each latter group having a number of further signals equal to said first predetermined number of pitch code elements, said first demodulating means sustaining said predetermined signals of each of said successive first groups thereof for a time duration equivalent to said one repetitive time rate of said certain carrier waves for providing said successive first groups of further signals;

a plurality of second demodulating means having a number equal to said second preselected number of said other carrier waves, each of said last-mentioned demodulating means having a narrow frequency band width corresponding to said different narrow frequency band width of each of said spectrum code element modulated other carrier waves, for demodulating each of successive second groups of said predetermined signals, each latter group having a number of predetermined signals equal to said second preselected number of other carrier waves, into successive second groups of further signals, each latter group having a number of further signals equal to said second predetermined number of spectrum code elements multiplied by the number of said spectrum components in said group thereof, said second demodulating means sustaining said predetermined signals of each of said second groups thereof for a time duration equivalent to said different repetitive time rate of each of said other carrier waves for providing said successive second groups of further signals;

means for arranging said further signals of said first and second groups thereof in a time sequence;

program means for simultaneously controlling said first and second demodulating means and further signal arranging means to arrange said last-mentioned further signals of said first and second groups thereof in a third predetermined time sequence equivalent to a combination of said first and second predetermined time sequences of said pitch and code elements, respectively, in each of said successive sampling periods;

means for decording said further signals of said successive first and second groups thereof as arranged in said third predetermined time sequence in each of said successive sampling periods to provide successive discrete first additional signals, each corresponding to one of said discrete pitch components, and successive groups of second additional signals, each latter group corresponding to one of said successive groups of spectrum components, each of said first additional signals representing one of said first further signal groups and each of said second additional signal groups representing one of said second further signal groups and having a number of second additional signals equal to said number of said further signals in each of said second groups thereof divided by said second predetermined number of spectrum code elements;

means controlled by said program means simultaneously with said simultaneous control of said first and second demodulating means and further signal arranging means by said last-mentioned program means for simultaneously selecting from said decoding means one of said first additional signals and one of said groups of second additional signals corresponding to said pitch component and one group of spectrum components, respectively, derived from each input telephone signal in each of said sampling periods;

a plurality of voice signal synthesizing means, each connectable in turn to said selecting means, for synthesizing said selected first additional signal and one group of second additional signals into a voice signal representing one of said telephone signals in each of said successive sampling periods;

and a plurality of voice frequency transmission channels, each connected to one of said synthesizing means, for receiving said synthesized voice signals.

16. A wireless receiver apparatus for receiving a plurality of multiplexed telephone signals, each signal represented by a first preselected number of certain carrier waves having different frequencies and occurring at one repetitive time rate and modulated by a first predetermined number of pitch code elements derived from a corresponding pitch component separated from said signal to provide each of said last-mentioned modulated certain carrier waves with one narrow frequency band width in a first predetermined time sequence in each of successive sampling periods for transmission in a first wireless transmission path having said one narrow frequency band width, said last-mentioned one signal also represented at the same time by a second preselected number of other carrier waves having frequencies different from those of said certain carrier waves and occurring at a repetitive time rate different from said one repetitive time rate and modulated by a second predetermined number of spectrum code elements derived from each spectrum component of a corresponding group of spectrum components separated from said signal to provide each of said modulated other carrier waves with a narrow frequency band width different from said one narrow frequency band width in a second predetermined time sequence in each of said successive sampling periods for transmission in a second wireless transmission path having said different narrow frequency band width, said pitch and spectrum code element modulated certain and other carrier waves transmitted as carrier waves having frequencies higher than those of said last-mentioned certain and other carrier waves and also having one and different frequency band widths corresponding to said one and different band widths of said modulated certain and other carrier waves, respectively, comprising:

means for receiving said higher frequency carrier waves;

means for converting said received higher frequency carrier waves into a plurality of signals having different frequencies, one and different repetitive time rates and one and different frequency band widths corresponding to those of said modulated certain and other carrier waves in accordance with said first and second predetermined time sequences in each of said successive sampling periods, said last-mentioned converted signals having a number equal to the sum of said first and second preselected numbers of certain and other carrier waves;

means for distributing said converted signals on a frequency basis corresponding with that of said pitch and spectrum code element modulated carrier waves;

a plurality of oscillators having a number equal to the sum of said first and second preselected numbers of said certain and other carrier waves and frequencies equivalent to those of said last-mentioned carrier waves;

a plurality of frequency converters, each connected to said distributing means and a different one of said oscillators, for converting a first group of said converted signals into a group of predetermined signals, each latter signal having a predetermined frequency, and each latter group having a number of signals equal to said number of oscillators;

a plurality of first demodulating means having a number equal to said first preselected number of certain carrier waves, each of said demodulating means also having a narrow frequency band width corresponding to said one narrow frequency band width of each of said pitch code element modulated certain carrier waves, for demodulating each of successive first groups of said predetermined signals, each latter group having a number of said predetermined signals equal to said first preselected number of said certain carrier waves, into successive first groups of further signals, each latter group having a number of further signals equal to said first predetermined number of pitch code elements, said first demodulating means sustaining said predetermined signals of each of said successive first groups thereof for a time duration equivalent to said one repetitive time rate of said certain carrier waves for providing said last-mentioned successive first groups of further signals;

a plurality of second demodulating means having a number equal to said second preselected number of other carrier waves, each latter means also having a narrow frequency band width corresponding to said different narrow frequency band width of each of said spectrum code element modulated other carrier waves, for demodulating each of successive second groups of said predetermined signals, each latter group having a number of predetermined signals equal to said second preselected number of other carrier waves, into successive second groups of further signals, each latter group having a number of further signals equal to said second predetermined number of spectrum code elements multiplied by the number of said spectrum components in said group thereof, said second demodulating means sustaining said predetermined signals of each of said second groups thereof for a time duration equivalent to said different repetitive time rate of each of said other carrier waves for providing said last-mentioned successive second groups of further signals;

means for arranging said further signals of said first and second groups thereof in a time sequence;

program means for simultaneously controlling said first and second demodulating means and further signal arranging means to arrange said last-mentioned further signals in a third predetermined time sequence equivalent to a combination of said first and second predetermined time sequences of said pitch and spectrum code elements, respectively, in each of said successive sampling periods;

first means for decoding said successive first groups of further signals arranged in said third predetermined time sequence to provide successive first additional signals corresponding to successive pitch components;

second means for decoding said successive second groups of further signals arranged in said third predetermined time sequence to provide successive groups of second additional signals corresponding to successive groups of said spectrum components;

first selecting means actuated by said program means simultaneously with the control of said first and second demodulating means and further signal arranging means for selecting said first additional signals one at a time from said first decoding means in each of said successive sampling periods;

second selecting means actuated simultaneously with the actuation of said first selecting means and simultaneous control of said first and second demodulating means and further signal arranging means for selecting said groups of second additional signals, one of said latter groups at a time, from said second decoding means in each of said successive sampling periods;

a plurality of voice frequency synthesizing means, each connectable in turn to said first and second selecting means at the same time for synthesizing said selected one of said first additional signals and one group of said groups of second additional signals into a voice signal representing one of said telephone signals in each of said successive sampling periods;

and a plurality of voice frequency channels, each connected to one of said synthesizing means, for receiving said synthesized voice signals.

17. A wireless receiver apparatus for receiving a multiplexed telephone signal represented by a first preselected number of certain carrier waves having different frequencies and occurring at one repetitive time rate and modulated by a first predetermined number of pitch code elements derived from a pitch component separated from said signal to provide each of said modulated certain carrier waves with one narrow frequency band width in a first predetermined time sequence in a sampling period for transmission in a first wireless transmission path having said one narrow frequency band width, said signal also represented at the same time by a second preselected number of other carrier waves having frequencies different from those of said certain carrier waves and occurring at a repetitive time rate different from said one repetitive time rate and modulated by a second predetermined number of spectrum code elements derived from each spectrum component of a group of spectrum components separated from said signal to provide each of said modulated other carrier waves with a narrow frequency band width different from said one narrow frequency band width in a second predetermined time sequence in said sampling period for transmission in a second wireless transmission path having said different narrow frequency band width, said pitch and spectrum code element modulated certain and other carrier waves transmitted as carrier waves having frequencies higher than those of said last-mentioned certain and other carrier waves and also having one and diffeent frequency band widths corresponding to said one and different frequency band widths of said modulated certain and other carrier waves, respectively, comprising:

means for receiving and converting said higher frequency carrier waves into a plurality of discrete signals having predetermined frequencies, one and different repetitive time rates and one and different frequency band widths corresponding to those of said modulated certain and other carrier waves in accordance with said first and second predetermined time sequences in said sampling period, said predetermined signals having a number equal to the sum of said first and second preselected numbers of certain and other carrier waves;

a plurality of first demodulating means having a number equal to said first preselected number of certain carrier waves, each latter means also having a narrow frequency band width corresponding to said one narrow frequency band width of each of said pitch code element modulated certain carrier waves, for demodulating a first group of said predetermined signals, said latter group having a number of said predetermined signals equal to said first preselected number of said certain carrier waves, into a first group of further signals, said latter group having a number of further signals equal to said first predetermined number of pitch code elements, said first demodulating means sustaining said predetermined signals of said first group for a time duration equivalent to said one repetitive time rate of said certain carrier waves for providing said first group of further signals;

a plurality of second demodulating means having a number equal to said second preselected number of other carrier waves, each latter means also having a narrow frequency band width corresponding to said different narrow frequency band width of each of said spectrum code element modulated other carrier waves, for demodulating a second group of said predetermined signals, said latter group having a number of predetermined signals equal to said second preselected number of other carrier waves, into a second group of further signals, said latter group having a number of further signals equal to said second predetermined number of spectrum code elements multiplied by the number of said spectrum components in said group thereof, said second demodulating means sustaining said predetermined signals of said second group for a time duration equivalent to said different repetitive time rate of each of said other carrier waves for providing said second group of further signals;

means for arranging said further signals of said first and second groups thereof in a time sequence;

program means for simultaneously controlling said first and second demodulating means and further signal arranging means to arrange said last-mentioned further signals in a third predetermined time sequence equivalent to a combination of said first and second predetermined time sequences of said pitch and spectrum code elements, respectively;

means for decoding said further signals of said first and second groups thereof arranged in said third predetermined time sequence to provide a first additional signal corresponding to said pitch component and a group of second additional signals corresponding to said group of spectrum components, said first additional signal representing said first further signal group and said second additional signal group representing said second further signal group, said second additional signal group having a number of second additional signals equal to said number of said further signals in said second group thereof divided by said second predetermined number of spectrum code elements;

voice frequency synthesizing means connected to said decoding means for simultaneously selecting therefrom said first additional signal and group of second additional signals to synthesize said last-mentioned simultaneously selected first additional signal and group of second additional signals into a voice signal corresponding to said telephone signal in said sampling period;

and voice frequency channel means connected to said synthesizing means for receiving said synthesized voice signal therefrom.

18. A wireless communication system for multiplex telephone signals, each having a plurality of different narrow frequency band widths, comprising:

transmitter apparatus including:

a plurality of sources of telephone signals;

a plurality of frequency separating means, each connected to one of said sources for separating the signal thereof into a pitch component and a group of spectrum components;

first program means;

first selecting means connectable to each of said separating means in turn for selecting one pitch component therefrom in each of successive sampling periods second selecting means connectable to each of said separating means in turn for selecting one of said groups of spectrum components in each of successive sampling periods; said first and second selecting means simultaneously actuated by said first program means to select said one pitch component and group of spectrum components at the same time from each of said separating means in turn in each of said successive sampling periods;

first encoding means for encoding each of said selected one pitch components in turn into a first predetermined number of pitch code elements;

second encoding means for encoding each spectrum component in turn in each of said selected one group of spectrum components in turn into a second predetermined number of spectrum code elements, each latter group of spectrum components being encoded into a number of spectrum code elements equal to the number of spectrum components in each group thereof multiplied by said predetermined number of spectrum code elements, said first and second encoding means simultaneously encoding said selected one pitch component and one group of spectrum components as said last-mentioned one pitch component and one group of spectrum components are simultaneously selected from each of said separating means in turn in each of said successive sampling periods;

first sequence means for arranging said pitch and spectrum code elements in a time sequence;

means for generating a plurality of carrier waves having different frequencies and a number equal to the sum of said first and second predetermined numbers of pitch and spectrum code elements;

means for modulating said carrier waves with said pitch and spectrum code elements;

third selecting means for selecting said carrier waves one at a time from said generating means for application to said modulating means; said first program means simultaneously controlling said first sequence means and third selecting means together with said simultaneous actuation of said first and second selecting means to apply said pitch and spectrum code elements and carrier waves in a first predetermined time sequence in each of said successive sampling periods to said modulating means to modulate each of certain of said carrier waves with one of said pitch code elements and each of others of said carrier waves with one of said spectrum code elements and at the same time to apply said certain and other carrier waves at one and different repetitive time rates, respectively, to said modulating means in said first predetermined time sequence in each of said successive sampling periods to compress each of said pitch code element modulated certain carrier waves into one narrow frequency band width corresponding to said one repetitive time rate and to compress each of said spectrum code element modulated other carrier waves into a narrow frequency band width different from said one narrow frequency band width and corresponding to said different repetitive time rate;

and means for transmitting said pitch and spectrum code element modulated certain and other carrier waves as carrier waves having frequencies higher than those of said last-mentioned certain and other carrier waves and one and different repetitive time rates and one and different frequency band widths corresponding with said one and different repetitive time rates and one and different frequency band widths of said last-mentioned certain and other carrier waves, respectively, in said first predetermined time sequence in each of said successive sampling periods;

and receiver apparatus including:

means for receiving said higher frequency carrier waves;

means for converting said received higher frequency carrier waves into a plurality of signals having different frequencies, one and different repetitive time rates and one and different frequency band widths corresponding to those of said modulated certain and other carrier waves in accordance with said predetermined time rate in each of said successive sampling periods, said last-mentioned converted signals having a number equal to the sum of the numbers of said certain and other carrier waves;

means for distributing said converted signals on a frequency basis corresponding with that of said modulated certain and other carrier waves;

a plurality of oscillators having a number equal to said last-mentioned sum of said certain and other carrier waves and frequencies equivalent to those of said last-mentioned carrier waves;

a first plurality of frequency converters, each connected to said distributing means and a different one of said oscillators, for converting a first group of said converted signals into a group of predetermined signals, each latter signal having a predetermined frequency and each latter group having a number of signals equal to said last-mentioned sum of said certain and other carrier waves;

a plurality of first demodulating means having a number equal to the number of said certain carrier waves, each of said demodulating means having a narrow frequency band width corresponding to said one narrow frequency band width of each of said pitch code element modulated certain carrier waves, for demodulating each of successive first groups of said predetermined signals, each latter group having a number of predetermined signals equal to the number of said certain carrier waves, into successive first groups of further signals equal to said first predetermined number of pitch code elements, said first demodulating means sustaining said predetermined signals of each of said successive first groups thereof for a time duration equivalent to said one repetitive time rate of said certain carrier waves for providing said successive first groups of further signals;

a plurality of second demodulating means having a number equal to the number of said other carrier waves, each latter means also having a narrow frequency band corresponding to said different narrow frequency band width of each of said spectrum code element modulated other carrier waves, for demodulating each of successive second groups of said predetermined signals, each latter group having a number of predetermined signals equal to said last-mentioned number of other carrier waves, into successive second groups of further signals, each latter group having a number of further signals equal to said second predetermined number of spectrum code elements multiplied by the number of spectrum components in said group thereof, said second demodulating means sustaining said predetermined signa's of each of said successive second groups thereof for a time duration equivalent to said different repetitive time rate of each of said other carrier waves for providing said last-mentioned successive second groups of further signals;

second sequence means for arranging said further signals of said first and second groups thereof in a time sequence;

second program means for simultaneously controlling said first and second demodulating means and second sequence means to arrange said last-mentioned further signals in a second predetermined time sequence equivalent to said first predetermined time sequence of said pitch and spectrum code elements in each of said successive sampling periods;

first means for decoding said successive first groups of further signals arranged in said second predetermined time sequence to provide successive first additional signals corresponding to said successive pitch components at said separating means;

second means for decoding said successive second groups of further signals arranged in said second predetermined time sequence to provide successive groups of second additional signals corresponding to successive groups of said spectrum components at said separating means;

fourth selecting means;

fifth selecting means;

said fourth and fifth selecting means actuated by said second program means simultaneously with the simultaneous control of said first and second demodulating means and second time sequence means by said last-mentioned program means for simultaneously selecting each of said first additional signals and each of said groups of second additional signals from said first and second decoding means, respectively, in each of said successive sampling periods;

a plurality of voice frequency synthesizing means, each connectable in turn to said fourth and fifth selecting means at the same time for synthesizing said selected one first additional signal and one group of second additional signals into a voice signal representing one of said telephone signals in each of said successive sampling periods;

and a plurality of voice frequency channels, each connected to one of said synthesizing means, for receiving said synthesized voice signals.

19. A wireless communication system for multiplex telephone signals, each having a plurality of different frequency band widths, comprising:

transmitter apparatus including:

a plurality of sources of telephone signals;

a plurality of frequency separating means, each connected to one of said sources for separating the signal thereof into a pitch component and a group of spectrum components;

means for encoding each of said pitch components into a first predetermined number of pitch code elements and each spectrum component of each of said groups of spectrum components into a second predetermined number of spectrum code elements;

means for arranging said pitch and spectrum code elements in a time sequence;

a plurality of sources of carrier waves having different frequencies and a number equal to the sum of said first and second predetermined numbers of pitch and spectrum code elements, respectively;

means for simultaneously controlling said encoding means, code element sequence means and selection of said carrier waves from said generating means to apply said pitch and spectrum code elements and carrier waves in a predetermined time sequence in each of successive sampling periods to said modulating means to modulate each of certain of said carrier waves with one of said pitch code elements and each of others of said carrier waves with one of said spectrum code elements and at the same time to apply said certain and other carrier waves at one and different repetitive time rates, respectively, to said modulating means in said predetermined time sequence in each of said successive sampling periods to compress each of said pitch code element modulated certain carrier waves into one narrow frequency band width corresponding to said one repetitive time rate and to compress each of said spectrum code element modulated other carrier waves into a narrow frequency band width different from said one frequency band width and corresponding to said different repetitive time rate;

and means for transmitting said pitch and spectrum code element modulated certain and other carrier waves as corresponding carrier waves having frequencies higher than those of said last-mentioned certain and other carrier waves and also having one and different repetitive time rates and one and different narrow frequency band widths corresponding to said one and different time rates and one and different narrow frequency band widths of said last-mentioned carrier waves, respectively, in said predetermined time sequence in each of said successive sampling periods;

and receiver apparatus including means for receiving said transmitted higher frequency corresponding certain and other carrier waves to synthesize voice signals representing said telephone signals.

References Cited

UNITED STATES PATENTS

| | | | |
|---|---|---|---|
| 2,817,711 | 12/1957 | Feldman | 179—15.55 |
| 2,911,473 | 11/1959 | Van Duuren | 178—50 |
| 3,020,344 | 2/1962 | Prestigiacomo | 179—1 |
| 3,109,142 | 10/1963 | McDonald | 179—1 |
| 3,226,644 | 12/1965 | Goode et al. | 343—204 |

JOHN W. CALDWELL, *Primary Examiner.*

J. T. STRATMAN, *Assistant Examiner.*